United States Patent [19]

Periou et al.

[11] 4,260,189

[45] Apr. 7, 1981

[54] DEVICE FOR CLOSING A SLIDABLE ELEMENT SUCH AS A SLIDING ROOF OF AN AUTOMOBILE VEHICLE

[75] Inventors: Pierre Periou, Clergy; Marc Rampignon, Villemomble, both of France

[73] Assignee: Compagnie Industrielle de Mecanismes, France

[21] Appl. No.: 919,782

[22] Filed: Jun. 28, 1978

[30] Foreign Application Priority Data

Jul. 11, 1977 [FR] France ................................ 77 21260

[51] Int. Cl.³ .............................................. B60J 7/04
[52] U.S. Cl. ..................................... 296/223; 49/210; 74/89.18
[58] Field of Search ........................ 296/137 E, 137 F; 49/210, 223, 225, 235, 262, 230; 74/89.18, 89.19, 422

[56] References Cited

U.S. PATENT DOCUMENTS

| 2,245,832 | 6/1941 | Simpson ............................ 296/137 F |
| 2,989,008 | 6/1961 | Lindstrom ............................... 49/210 |

FOREIGN PATENT DOCUMENTS

| 137327 | 9/1962 | Fed. Rep. of Germany ....... 296/137 F |
| 58790 | 4/1954 | France ................................. 296/137 F |

Primary Examiner—David M. Mitchell
Attorney, Agent, or Firm—Holman & Stern

[57] ABSTRACT

Mounted on the slidable element is a transverse spindle which is guided in rectilinear translation. A driving gear pinion meshed with a fixed longitudinal rack is fixed on the spindle. The device comprises a toothed member which is pivotally mounted on the front end of the rack and has a set of teeth including a curved front portion and a rectilinear rear portion. A device is provided for constraining the pinion to remain meshed with the curved portion at the end of the closing travel.

10 Claims, 5 Drawing Figures

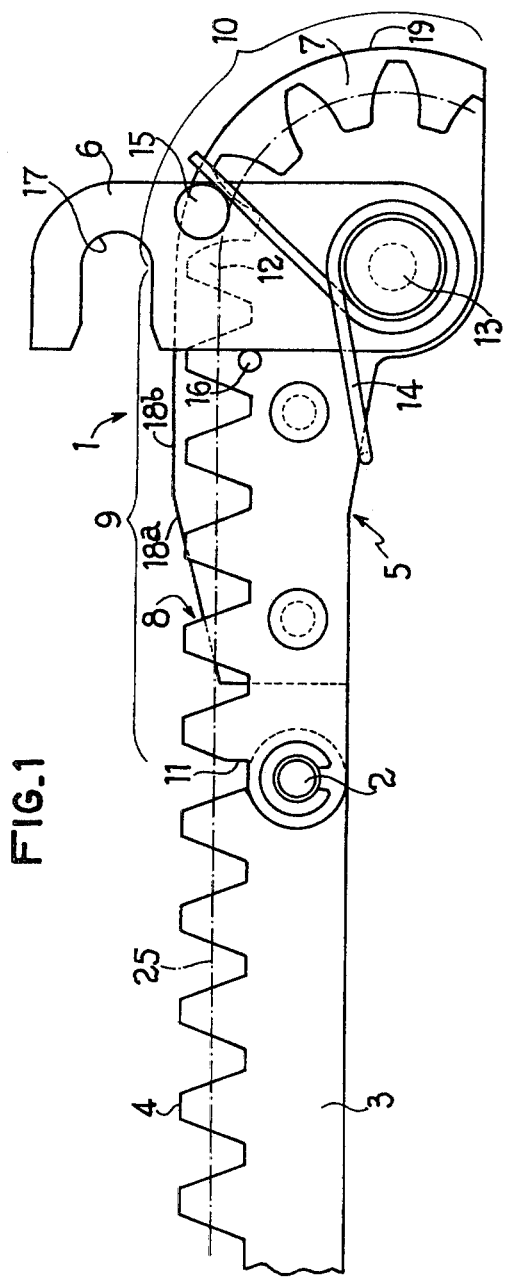
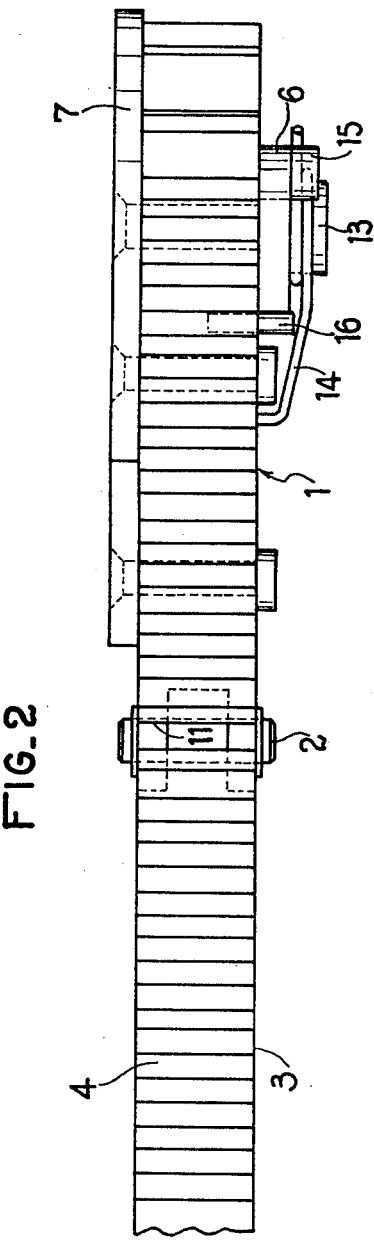
FIG.1
FIG.2

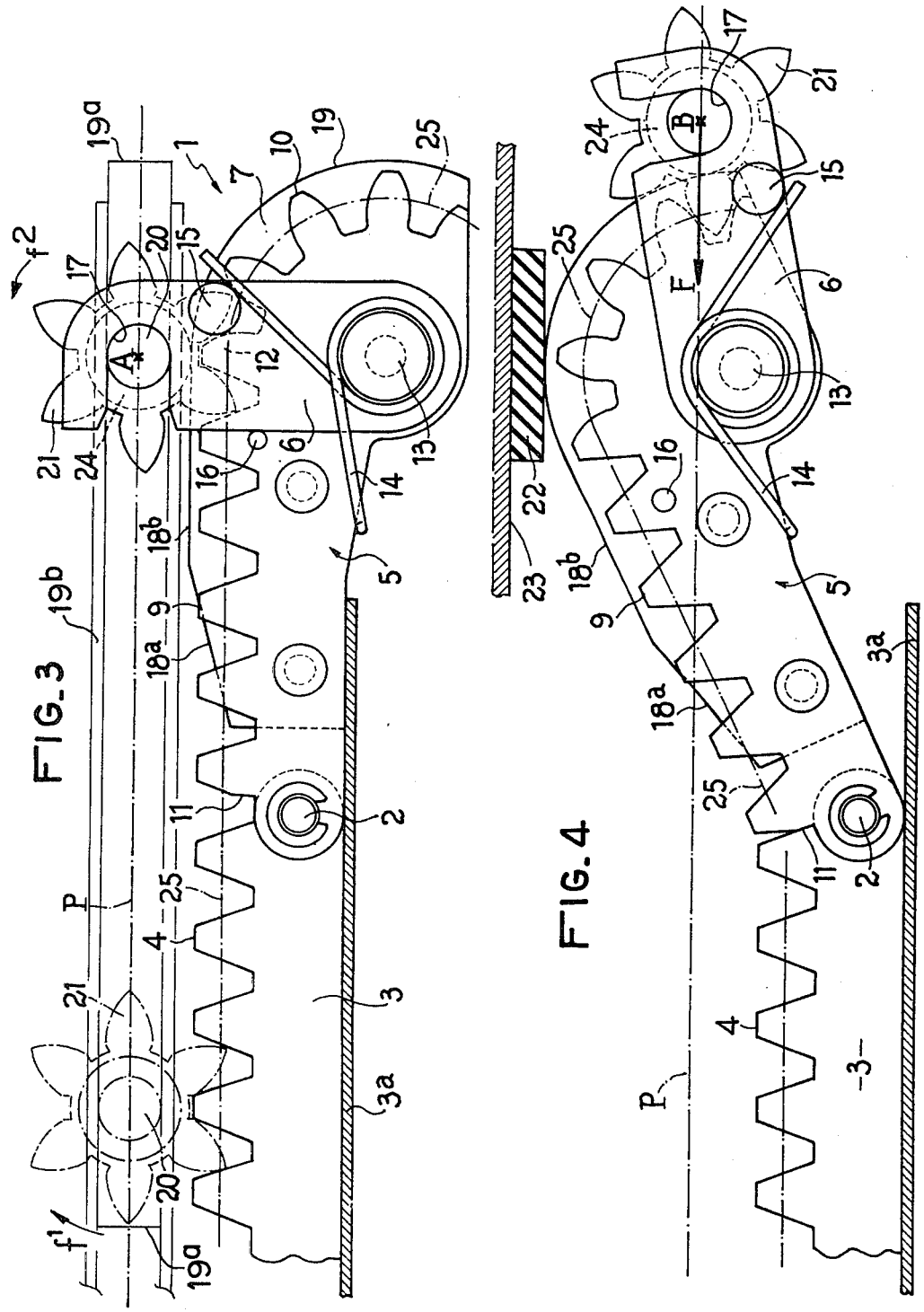

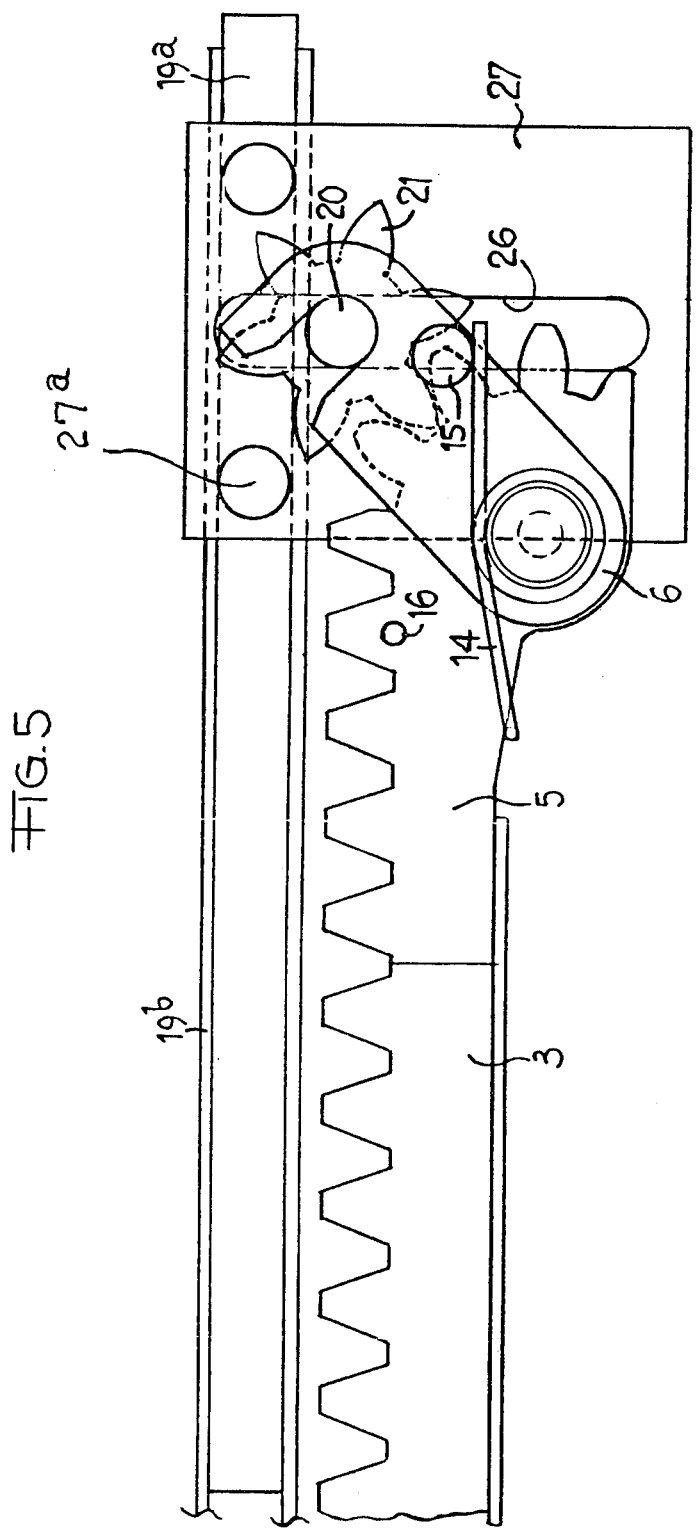

DEVICE FOR CLOSING A SLIDABLE ELEMENT SUCH AS A SLIDING ROOF OF AN AUTOMOBILE VEHICLE

The present invention relates to a device for closing a slidable element, in particular a sliding roof of an automobile vehicle, on which is mounted a transverse rod carrying a driving gear pinion which is meshed with a fixed longitudinally-extending rack.

When closing a sliding roof of an automobile vehicle, the driving force usually remains constant and moderate during practically the whole of the travel and suddenly increases during the last centimeter or centimeters, for putting fabric under tension when it concerns a flexible roof or for compressing the sealing elements in the case of a rigid roof.

It will be understood that the power of the motor must be calculated for the final effort, which is expensive and moreover dangerous in the event that a passenger passes his head through the opening of the roof when the motor is operated.

Furthermore, it is known to employ a unidirectional speed reducer for precluding the re-opening of the roof. In this case, the component parts of the speed reducer must be capable of permanently withstanding the final effort, sometimes during several months. Consequently, they remain under stress for a long period while being exposed to considerable climatic variations and may consequently become deformed, for example if they are made from a material which creeps or distorts at high surrounding temperature.

An object of the invention is to provide a closing device whereby it is possible to considerably reduce the torque required for providing the final closing force and at the same time for locking the slidable element in the closed position thereof while relieving the component parts of the speed reducer of stress.

According to the invention, there is provided a device for closing a slidable element, in particular an openable roof of an automobile vehicle, on which is mounted a transverse spindle carrying a driving gear pinion meshed with a fixed longitudinally-extending rack, a toothed member extending the front end of the rack and having a set of teeth which has a curved front portion and a substantially rectilinear rear portion, and means for constraining the pinion to remain meshed with said curved portion of the teeth at the end of the closing travel.

Preferably, in order to relieve also the teeth of the pinion and of the rack stress, the toothed member comprises, at least in the curved portion thereof, a ramp of the same profile on which bears a roller carried by the spindle.

Further features and advantages of the invention will be apparent from the ensuing description given merely by way of example with reference to the accompanying drawings, in which:

FIG. 1 is a side elevational view of a closing device according to the invention;

FIG. 2 is a plan view of the device shown in FIG. 1;

FIGS. 3 and 4 are views similar to FIG. 1 illustrating the operation of this device; and FIG. 5 is a side elevational view of a modification of the device.

The device 1 shown in FIGS. 1 and 2 is pivotally mounted at its rear end by a pin 2 on the front end of a fixed rectilinear rack 3 whose teeth 4 are provided on its top side. This device comprises mainly a toothed member 5, a hook 6 and a ramp 7.

The member 5 is a small rack whose teeth 8, in the position of rest illustrated in FIG. 1, extend and have the same width as the teeth 4 of the fixed rack 3. The set of teeth 8 comprises a rectilinear rear portion 9 the teeth of which have planar sides, and a front portion 10 in the form of a sector of a toothed wheel extending along a little more than a quarter of a circle downwardly from the portion 9, the teeth of this portion 10 having curved convex sides. In order to allow the swinging of the member 5 upwardly about the pin 2, the base 11 of its first tooth is cut away. The tooth 12 located at the junction between the portions 9 and 10 of the set of teeth 8 has a planar rear side and a curved convex front side.

The hook member 6 is formed by a rectilinear planar lever assembled against one side of the member 5. The lower end of the lever is journalled on a pin 13 which extends through the center of the quarter of a circle 10. A spiral spring 14 under stress between the lower face of the member 5 and a stud 15 on the lever 6 and wound around the pin 13, normally maintains this lever in a vertical position of abutment against a stop member 16 which extends laterally from the member 5. The portion of the lever 6 which extends beyond the set of teeth 8 has a rearwardly open notch 17 the inner end of which is of semi-circular shape and centered on the vertical from the axis of the pin 13.

The ramp 7 is formed by a metal sheet which is placed and riveted against the side face of the member 5 opposite to the lever 6. The upper edge of this sheet forms a rolling ramp or track which is parallel to the set of teeth 8 but slightly projects from the latter, this ramp being preceded by an upwardly inclined lead-on portion $18^a$. The ramp 7 has a planar rear portion $18^b$ and a front portion 19 in the shape of a quarter of a cylinder.

The device 1 is used at the front end of a sliding roof of an automobile vehicle under the following conditions, illustrated in FIGS. 3 and 4.

The openable or sliding roof is mounted on a slide element $19^a$ which carries a rotatable transverse spindle 20. This element $19^a$ is guided in horizontal translation by guide means $19^b$ so that the element $19^a$ and spindle 20 travel in a plane P containing the center of the notch 17. The inner end of the latter has the same diameter as the spindle 20. This spindle is connected in a slip-free manner to spindle rotating means in the form of the output member of the speed reducer of a motor driving the sliding roof (not shown). Keyed on both ends of the spindle is a gear pinion 21 which is for example of plastics materials and has teeth having convex curved sides and is meshed with the longitudinally-extending rack 3 which is fixed to the body structure $3^a$ of the vehicle. Each rack 3 carries at one end a pivotally mounted device described hereinbefore.

During almost the whole of its closing travel, each pinion 21 is meshed with the corresponding rack 3, as shown in dot-dash lines in FIG. 3. Thereafter, the pinion rolls in the direction $f^1$ along the portion 9 of the member 5 until the spindle 20 is received at point A at the end of the notch 17 of the hook member 6.

The pinion 21 continues to be driven in rotation in a direction $f^1$ by the spindle 20 the axis of which is constrained to move in the plane P by the element $19^a$ which slides in the guide means $19^b$. Consequently, the pinion rolls on the curved portion 10 of the teeth 8 with, simultaneously, a rotation of the member 5 upwardly about the pin 2 and a downward rotation of the hook member 6 relative to the member 5, in opposition to the action of the spring 14.

This movement continues until the ramp 7 encounters a flexible stop member 22 (not shown in FIG. 3) which is secured to the lower face of a rigid support 23 formed for example by the body structure of the vehicle. In this extreme position corresponding to a rotation of the member 5 about the pin 2 on the order of 20° to 30°, illustrated in FIG. 4, the center of the spindle 20 is located at point B and has slightly passed beyond the line through the axes of the pins 2 and 13, or, which amounts to the same thing, the line through the spindle 20, the top of the tooth of the pinion engaged with the portion 10 of the set of teeth 8 and the axis of the pin 2 has been passed through.

Simultaneously, a roller 24 freely rotatable on the corresponding end of the spindle 20, outside the pinion 21, has reached the rear portion $18^a$–$18^b$ of the ramp 7 and has rolled along the latter.

In the position shown in FIG. 4, the device 1 is self-locking irrespective of the pulling force in the direction of arrow F in the plane P. This force is roughly wholly supported by the bearing of the roller 24 against the portion 19 of the ramp 7. It is unnecessary to continue to exert torque on the spindle 20.

It will be understood that the same movements and effects are produced simultaneously at the other end of the spindle 20.

In practice, the portion 10 of the set of teeth 8 may be given a length slightly greater than that along which the closing force increases, that is to say a length of about 15 mm. The curvature of this portion 10 results in a considerable gearing down of the force so that the increase in the driving torque required is only about one half of that which would be necessary if the rack 3 extended to the point B.

It is clear from the foregoing that it is possible to employ a much weaker motor than in the prior art, this motor being provided with a speed reducer which is reversible and/or formed by cheap component parts, for example of plastics materials, since this speed reducer is not subjected to any great force when the roof is closed.

In order to open the roof, the motor drives the spindle 20 and the pinion 21, and consequently the element $19^a$ and the roof carried by the latter, in the direction of arrow $f^2$ which is opposite the direction of arrow $f^1$. The pinion then rolls along the portion 10 of the set of teeth 8 and causes the member 5 to return to its position of rest shown in FIG. 3 which is defined by its abutment against the body structure $3^a$ carrying the rack 3. During this time, the spring 14 causes the lever 6 to return to its vertical position against the stop member 16. The pinion 21 then rolls in succession along the portion 9 of the set of teeth 8 and along the rack 3.

By way of a modification, the roller 24 may have a diameter which is the pitch diameter of the pinion 21 and roll along a ramp which follows the pitch line 25 of the set of teeth 8. In this case, the roller 24 may be keyed on the spindle 20 or form part of the same material as the pinion 21, since it rotates at the same speed as the latter when it rolls along the ramp. This rigid interconnection between the roller and pinion may moreover be provided in all cases, since a rolling with sliding of the roller 24 on the ramp 7 presents no serious disadvantage.

As a further embodiment, the lever 6 may be suspended to be freely rotatable relative to the spindle 20, possibly with a return spring for biasing it against a stop member of a guide bearing for this spindle, with the notch 17 facing forwards and hooking a stud provided on the member 5 in the position of the pin 13. Other means may moreover be provided for constraining the pinion 21 to roll along the portion 10 of the set of teeth 8, for example a sheet secured to the side of the member 5 opposed to the ramp 7 and provided with a slot in the shape of a sector of a circle and open at the rear in the position of the notch 17 shown in FIG. 3.

The assembly comprising the member 5, the ramp 7 and possibly the aforementioned slotted sheet, may be moulded in a single piece from a suitable material.

Note that in practice, the fixed rack 3 has often a slight curvature in a vertical plane so as to follow the shape of the roof of the vehicle. In this case, the portion 9 of the member 5 has a similar curvature.

In another modification shown in FIG. 5, the member 5 is rigidly fixed to the rack 3 in the position shown in FIG. 1. Means are provided to allow the spindle 20 and the pinion 21 to move transversely of the rack 3. Said means comprising a vertical slot 26 provided in a guide bearing 27. This bearing is fixed to an element $19^a$ by studs $27^a$ and is thus guided in horizontal translation. FIG. 5 shows the pinion 21 in an intermediate position in which it starts to roll round the curved convex portion of member 5 as it moves down the slot 26 toward its extreme lower position adjacent the lower end of the slot 26.

The hook described hereinbefore constrains the curved portion of member 5 and the pinion 21 to remain meshed from the moment when the pinion 21 reaches the curved portion until the pinion reaches its end position and while it is in this end position. Spring 14 returns the hook to its vertical position when the pinion travels in the opposite direction.

It must be understood that the invention is also applicable to the closure of other sliding elements and in particular those, such as hermetically sealed doors, which require an increased force to be exerted thereon at the end of the travel.

Having now described our invention what We claim as new and desire to secure by Letters Patent is:

1. A device in combination with an element which is guidably mounted on a structure to be movable relative to the structure in a given substantially rectilinear longitudinal direction to an end position by means of said device, said device comprising a spindle for connection to spindle rotating means and extending transversely of said direction and rotatively mounted on said element, a driving gear pinion fixed on said spindle, a toothed rack fixed relative to said structure and extending in a direction parallel to said longitudinal direction, a toothed member extending said end of the rack and having a set of teeth having a curved convex portion remote from the rack and a substantially rectilinear portion adjacent the rack, the pinion being meshed with and rollable along the rack onto said substantially rectilinear portion and said curved convex portion of the toothed member to reach an end of said curved convex portion remote from the rack when said element reaches said end position, means for allowing at least one of two members consisting of the pinion and said toothed member to move relative to the rack transversely of said substantially rectilinear longitudinal direction while the pinion is meshed with said curved convex portion and thereby bringing said curved convex portion sufficiently interposed between the pinion and the rack that the pinion is prevented by said curved convex portion from moving toward the rack when said spindle is not driven in rotation by said spindle rotating means, and means for constraining the pinion and said curved convex portion to remain meshed from the moment when the pinion reaches said curved convex portion until said element reaches said end position.

2. A device as claimed in claim 1, wherein said toothed member is rigid with the rack and said means for allowing one of two members consisting of the pinion and said toothed member to move relative to the rack comprise a bearing mounted on said element and defining a slot substantially perpendicular to the rack in which slot the spindle is rotatable and substantially vertically movable.

3. A device as claimed in claim 1, wherein the curved portion of the toothed member has a shape of a sector of a circle.

4. A device in combination with an element which is guidably mounted on a structure to be movable relative to the structure in a given substantially rectilinear longitudinal direction to an end position by means of said device, said device comprising a spindle for connection to spindle rotating means and extending transversely of said direction and rotatively mounted on said element, a driving gear pinion fixed on said spindle, a toothed rack fixed relative to said structure and extending in a direction parallel to said longitudinal direction, a toothed member mounted on the rack to pivot about a pivot axis and extending said end of the rack and having a set of teeth having a curved convex portion remote from the rack and a substantially rectilinear portion adjacent the rack, the pinion being meshed with the rollable along the rack onto said substantially rectilinear portion and said curved convex portion of the toothed member to reach an end of said curved convex portion remote from the rack when said element reaches said end position, and means is constraining the pinion and said curved portion to remain meshed from the moment when the pinion reaches said curved convex portion until said element reaches said end position.

5. A device as claimed in claim 4, comprising a stop member mounted on said structure for limiting the pivotal movement of the toothed member relative to the rack in a position in which the toothed member has moved slightly beyond a position in which the center of the pinion, the center of curvature of said curved portion at a bearing point of the pinion thereon said pivot axis are in alignment with one another.

6. A device as claimed in claim 5, wherein the stop member comprises a flexible stop member and a rigid support carries the stop member.

7. A device as claimed in any one of the claims 1, 4, 2 and 5, wherein said pinion constraining means comprise a hook means for the spindle, the hook means being pivotally mounted on the toothed member, and means elastically biasing the hook means toward a position located in the path of said spindle in the region of the toothed member corresponding to a junction between said two portions of the toothed member.

8. A device as claimed in claim 7, wherein the curved portion of the toothed member has a shape of a sector of a circle and the hook means constitutes a free end portion of a lever having an opposite end portion which is pivotally mounted at the center of said curved portion.

9. A device as claimed in any one of the claims 1, 4 and 2, comprising in combination with the toothed member at least in said curved portion of the toothed member a ramp having the same profile and a roller carried by the spindle in bearing relation to the ramp.

10. A device as claimed in claim 9, wherein the roller is freely rotatable on the spindle.

* * * * *